(12) United States Patent
Karoliussen

(10) Patent No.: US 8,474,131 B2
(45) Date of Patent: Jul. 2, 2013

(54) APPARATUS FOR COLD JOINING A COUPLING ELEMENT TO A PIPE

(75) Inventor: Hilberg Karoliussen, Risor (NO)

(73) Assignee: Quickflange AS, Tvedestrand (NO)

( * ) Notice: Subject to any disclaimer, the term of this patent is extended or adjusted under 35 U.S.C. 154(b) by 9 days.

(21) Appl. No.: 12/940,539

(22) Filed: Nov. 5, 2010

(65) Prior Publication Data

US 2011/0109082 A1    May 12, 2011

Related U.S. Application Data

(62) Division of application No. 10/599,162, filed on Sep. 21, 2006, now Pat. No. 8,056,208.

(30) Foreign Application Priority Data

Mar. 24, 2004   (NO) .................................. 20041215

(51) Int. Cl.
*B23P 19/00* (2006.01)
(52) U.S. Cl.
USPC .................. 29/757; 29/282; 29/507; 29/518; 29/523; 285/258
(58) Field of Classification Search
USPC ................. 285/258, 382.4; 29/243, 282, 507, 29/518, 522.1, 523, 525, 757
See application file for complete search history.

(56) References Cited

U.S. PATENT DOCUMENTS

| | | |
|---|---|---|
| 1,753,005 A * | 4/1930 | Grady ............................. 29/507 |
| 2,252,274 A | 8/1941 | Rossheim et al. |
| 3,730,567 A | 5/1973 | Webster |
| 4,147,385 A | 4/1979 | van der Velden |
| 4,154,464 A | 5/1979 | Stary |
| 4,388,013 A | 6/1983 | Bergheim et al. |
| 4,413,395 A | 11/1983 | Garnier |
| 4,530,145 A | 7/1985 | Bergheim et al. |
| 4,593,448 A | 6/1986 | Ferrari Aggradi et al. |
| 4,934,038 A | 6/1990 | Caudill |
| 5,335,729 A * | 8/1994 | Turner et al. ................... 285/382 |
| 6,517,126 B1 | 2/2003 | Peterson |

FOREIGN PATENT DOCUMENTS

| | | |
|---|---|---|
| AU | 77373/91 B | 1/1990 |
| AU | 628743 | 9/1992 |
| DE | 2724257 | 12/1977 |
| DE | 3144385 | 5/1983 |

(Continued)

*Primary Examiner* — Donghai D. Nguyen
(74) *Attorney, Agent, or Firm* — Rodman & Rodman

(57) ABSTRACT

A tool for joining a coupling element, such as a flange to a pipe, wherein the coupling element surrounds the pipe and has grooves facing the pipe to receive a corresponding plurality of beads provided on the pipe. The tool has a plurality of axially separated, radially movable segments. Each segment has a plurality of circle sector formed ridges. The plurality of segments thereby provides circumferentially extending ridges that are capable of deforming a pipe wall by a first pressing action on the inside wall of the pipe to create on the outside of the pipe circumferential beads in the pipe wall and to cause these beads to extend into corresponding grooves in the coupling element. The segments also have circumferentially extending portions located adjacent and between the ridges. The extending portions in a second, subsequent passing action cause post-pressing of buckled-in areas that occur naturally in the pipe wall between and adjacent to the beads during the first pressing action, so that an outward tension is obtained in the pipe at the location of the coupling element.

11 Claims, 11 Drawing Sheets

FOREIGN PATENT DOCUMENTS

| | | |
|---|---|---|
| EP | 0570178 | 11/1993 |
| GB | 841869 | 7/1960 |
| JP | 33004410 | 6/1933 |
| JP | 56030689 | 3/1981 |
| JP | 56083684 | 7/1981 |
| JP | 56131026 | 10/1981 |
| JP | 59147917 | 10/1984 |
| JP | 61063330 | 4/1986 |
| JP | 61133229 | 8/1986 |
| JP | 10318452 | 12/1998 |
| RU | 2159689 | 11/2000 |

* cited by examiner

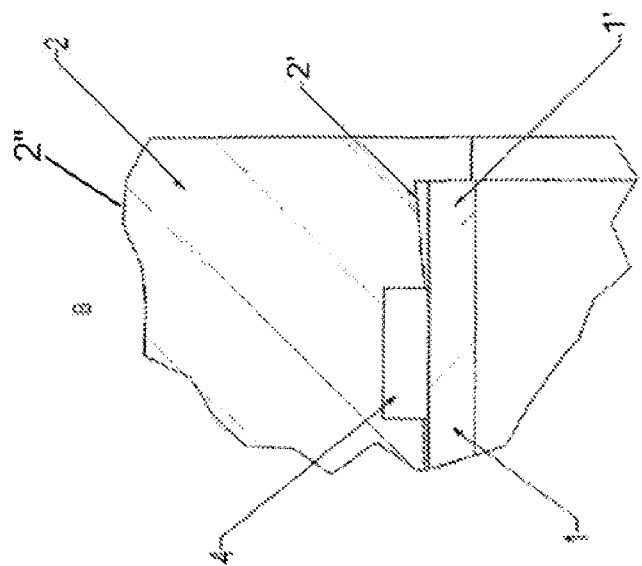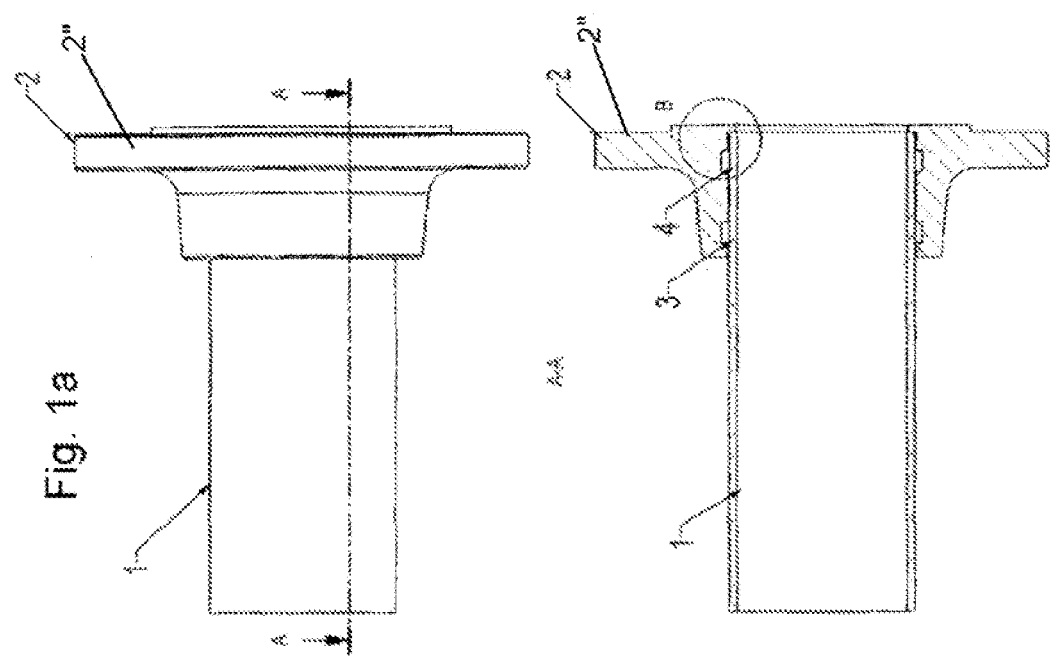

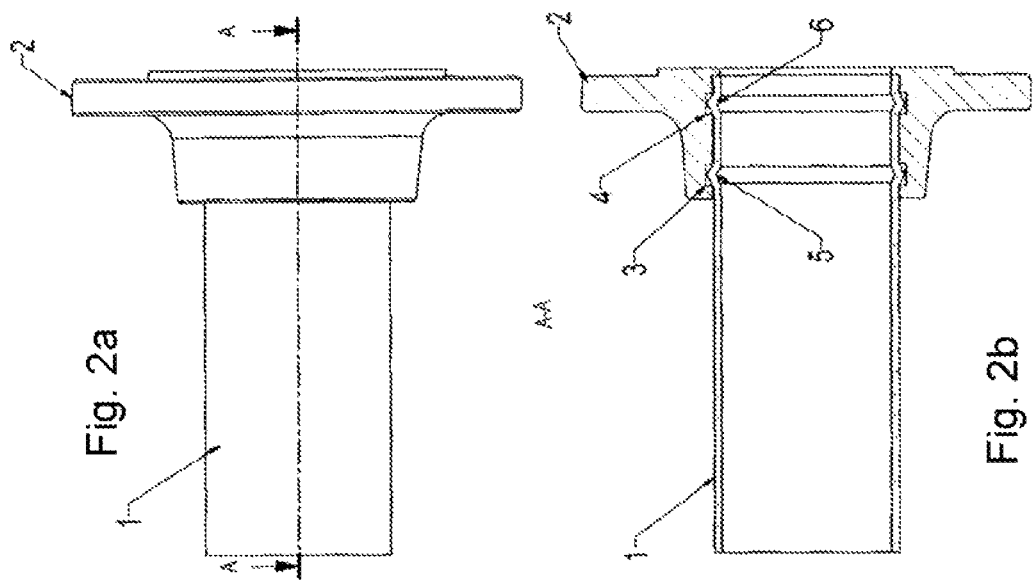

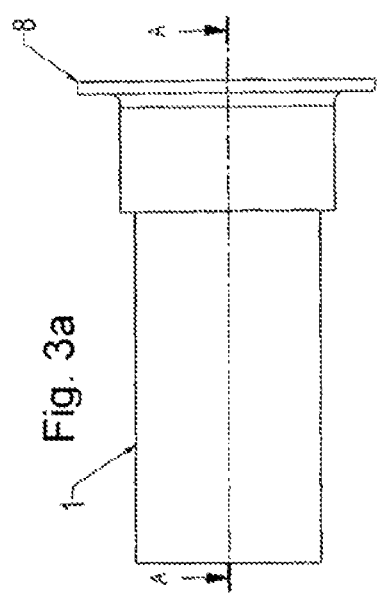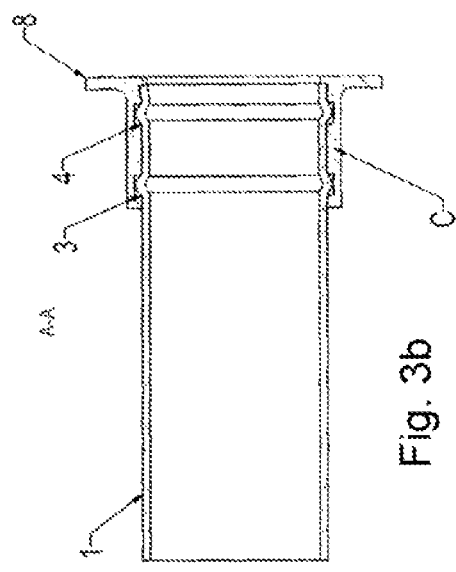

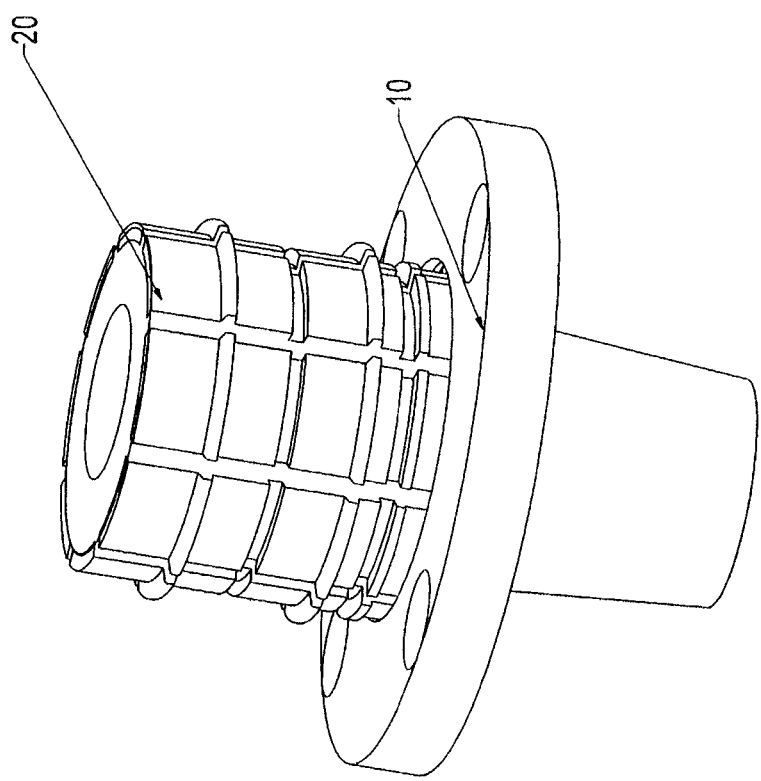

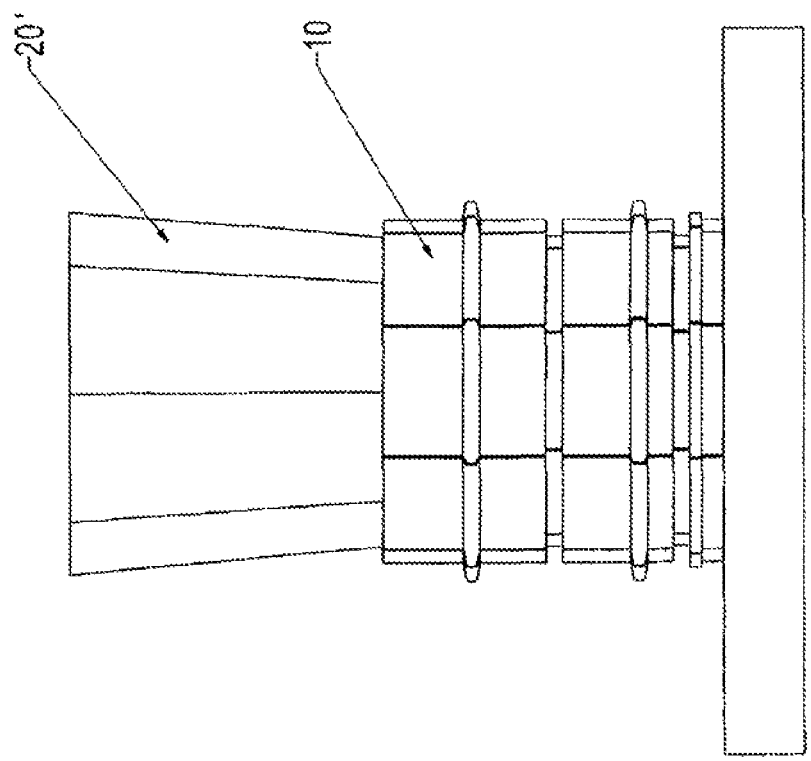

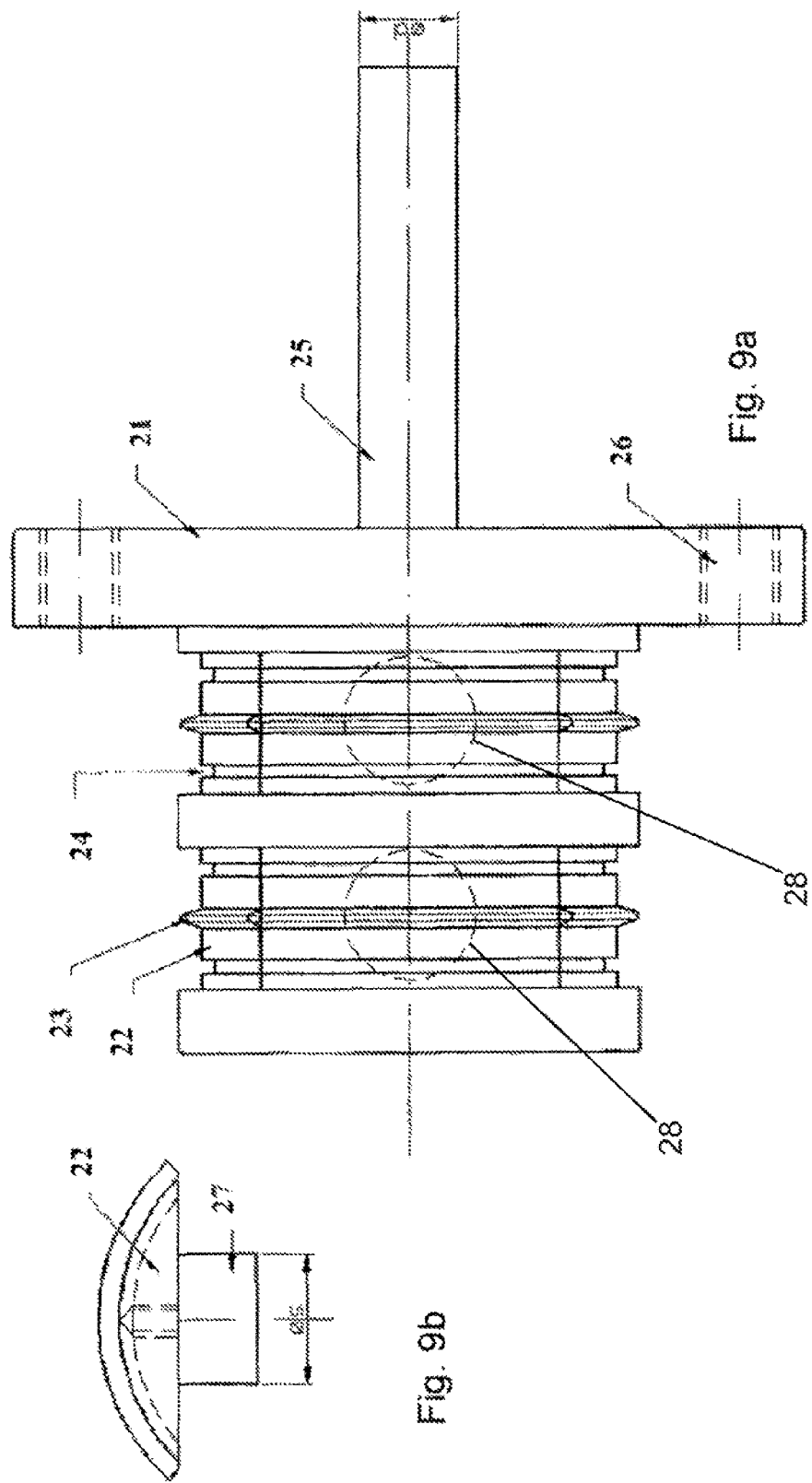

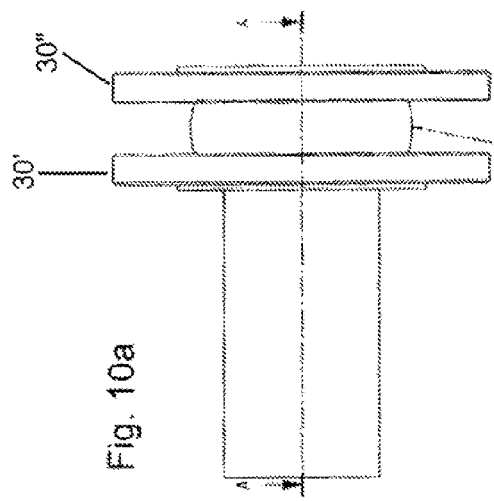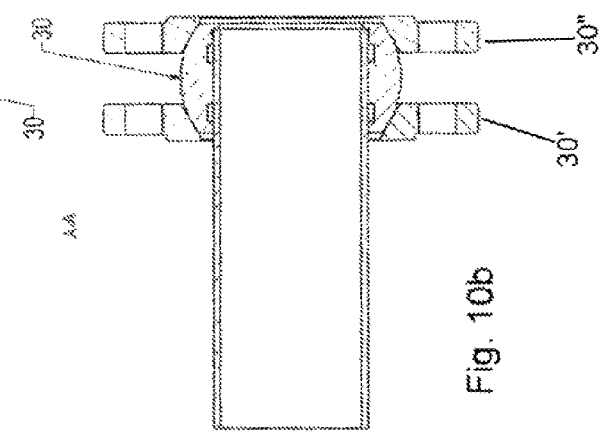

APPARATUS FOR COLD JOINING A COUPLING ELEMENT TO A PIPE

CROSS REFERENCE TO RELATED APPLICATIONS

This application is a divisional of application Ser. No. 10/599,162 filed Sep. 21, 2006, which issued as U.S. Pat. No. 8,056,208 on Nov. 15, 2011.

BACKGROUND OF THE INVENTION

The invention relates to a system and a tool for joining a coupling element, for example, a joining flange means, to a pipe, said coupling element surrounding the pipe and having grooves facing the pipe and intended to receive a corresponding plurality of beads provided on the pipe and a coupling element connectable to a pipe, said coupling element configured to surround the pipe and having grooves to face the pipe and to receive a corresponding plurality of beads provided on the pipe.

1. Field of the Invention

Flanges of many types and varieties are used extensively in industry when pipe-to-pipe or pipe-to-other component connections are to be provided. The welding of flanges to pipes is the most common method in the case of steel pipes and standard weldable metals, whilst, for example, screw flanges are used in connection with, for instance, galvanised pipes.

2. Description of Related Art

In recent years a number of methods have been developed for the fastening of coupling elements and the joining of pipes by deforming the pipe inside the coupling so as to secure it. Other methods and equipment which clamp the coupling to the outside of the pipe without any or with little deformation of the pipe have also been developed. Examples of such methods are taught in U.S. Pat. No. 4,593,448 and U.S. Pat. No. 4,147,385. DE 27 24 257 and U.S. Pat. No. 2,252,274 teach tools with rollers which by means of a rotating cone in the centre with rollers therearound will deform the pipe so that it fits into grooves in the coupling elements. DE 3144385 teaches a joining system for pipes where radially movable ridges, with the aid of hydraulic pressure against underlying pistons, press in beads. However, as discussed further below, the pipe wall on the side of the beads will buckle inwards, and when the ridges of the tool are retracted, the actual bead in the pipe will also retract somewhat, which makes the connection weak. In addition, there will be a metal-to-metal seal between pipe and coupling element, and therefore the system taught in the said document will require sealing material in the grooves of the coupling element. It has been found that with radial pistons as taught in DE 3144385 it is not possible to obtain an especially large radial force, and this principle could perhaps be used with particularly thin-walled pipes.

To deform a pipe wall into grooves in a surrounding coupling element requires very large forces if the pipe wall is to be pressed radially outwards. The use of rollers as described in DE 27 24 257 and U.S. Pat. No. 2,252,274 means that less radial force is required, but on the other hand the tool must be secured to the pipe and therefore becomes large so and heavy. Rolling subjects the material to harsher treatment and also takes longer than radial pressing.

BRIEF SUMMARY OF THE INVENTION

The object of the invention is to provide a system for joining flanges or other coupling elements to pipes where the tool is only operated radially so that a fixing of the pipe is not necessary. Furthermore, it is an object to obtain a tool which even in connection with small pipe dimensions has enough force to deform beads in relatively thick pipe walls. It is also an object that the tool should function so that inward tapering of the pipe end, which has been found to be a problem in connection with the radial pressing of beads, is avoided.

FIGS. 1a-c show a pipe 1 and coupling element 2 before beads 5, 6 are created. FIG. 2b shows the same after the beads 5, 6 created on the pipe 1 have been pressed into recesses 3, 4, respectively in the coupling element 2.

FIGS. 2a and 2b show the coupling element 2 fitted onto a pipe 1 and with beads 5, 6 pressed into place into recesses in the coupling element, the coupling element having a flange for attachment to another coupling element (not shown).

FIGS. 3a and 3b show a thin wall coupling 8.

FIGS. 10a and 10b show a coupling element structure 30 with flanges 30', 30" being tiltable relative to the structure 30 by movability over the partially spherical surface of the coupling element 30.

The principle of the tool is shown in FIGS. 4a, 4b, 5a and 5b, whilst different embodiments of a cone shaped member 20 (FIGS. 6-8) are used as a mechanical force amplifier and are fitted into the tool to cause expansion of the tool diameter to create beads in the pipe wall. FIG. 9 shows a tool with a hydraulic force amplifier.

During the development of the apparatus according to the invention, which comprises both an interior configuration of the external coupling element 2; 2' and the tool which forms the beads 5, 6, it was quickly discovered that the most critical parameter for optimal attachment resides in the configuration of the parts 11, 11 of the tool that presses the beads 5, 6 out from the pipe and also a part 14 of the tool that is to prevent the end of the pipe 1 from tapering inwards during the pressing operation.

BRIEF DESCRIPTION OF THE DRAWINGS

In the accompanying drawings:

FIG. 1a is a side view of the pipe and coupling, before the beads are pressed in;

FIG. 1b is a sectional view taken along the line A-A of FIG. 1a;

FIG. 1c is a fragmentary enlargement of portion B of FIG. 1b;

FIG. 2a is a side view of the pipe and coupling of FIGS. 1a and 1b, after the beads are pressed in;

FIG. 2b is a sectional view taken along the line A-A of FIG. 2a;

FIG. 3a is a side view of another embodiment of the pipe and coupling;

FIG. 3b is a sectional view taken along the line A-A of FIG. 3a;

FIG. 4a is a side view of a further embodiment of the pipe and coupling, before the beads are pressed in;

FIG. 4b is a sectional view taken along the line A-A of FIG. 4a;

FIG. 4c is a side view of the pipe and coupling of FIGS. 4a and 4b, after the beads are pressed in;

FIG. 5b is a section view taken along the line A-A of FIG. 5a;

FIG. 6 is a perspective view of an embodiment of the tool;

FIG. 8 is a side view of another embodiment of the tool;

FIG. 9a is side view of a further embodiment of the tool;

FIG. 9b is a top view of a segment of FIG. 9a shown separately;

FIG. 10a is a side view of a still further embodiment of the pipe and coupling;

FIG. 10b is a sectional view along the line A-A of FIG. 10a; and

DETAILED DESCRIPTION OF THE INVENTION

The invention is now to be described in further detail with reference to the attached drawing figures.

FIGS. 1a-1c and 2b show that an outermost portion 2' of the coupling element 2 against which pipe end 1' rests is flared outwards. This is to allow the tool to give the pipe end 1' an overbending outwards, which is necessary because the pipe end as mentioned, will otherwise tend to taper inwards. Thus, the pipe 1 will appear almost straight after the beads 5, 6 have been pressed, as can be seen in the section shown in FIG. 2b.

The same basic interior configuration of the coupling elements will apply to a coupling element or collar intended for loose flanges, movable flanges as shown in FIGS. 10a and 10b, and other types which may be suitable for a same fastening method.

It should be mentioned that the cylindrical part of the coupling element 2 as shown on FIGS. 1, 2 and 3 may advantageously be quite thin-walled. To a certain extent, the wall will then be resilient and yield a little during the pressing operation, and this will then mean that afterwards it is under inward tension and thus provides further pressure in the connection where the pipe 1 is in tension outwards.

Laboratory tests carried out show that a mechanically good seal is obtained between the grooves 3, 4 and the beads 5, 6 Nevertheless, it may be appropriate to insert a sealing material in one or more of the grooves.

Figure 4A:
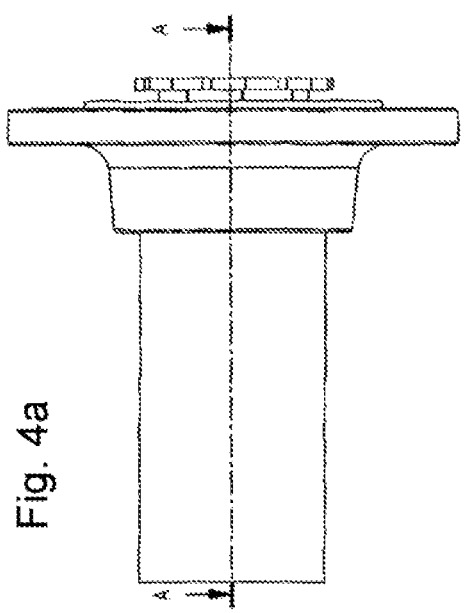
Figure 4B:
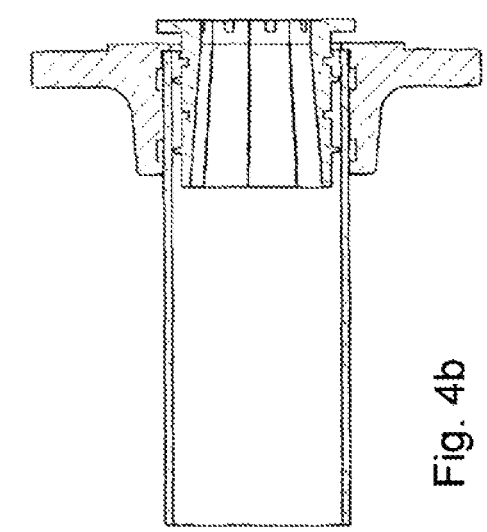
Figure 4C:
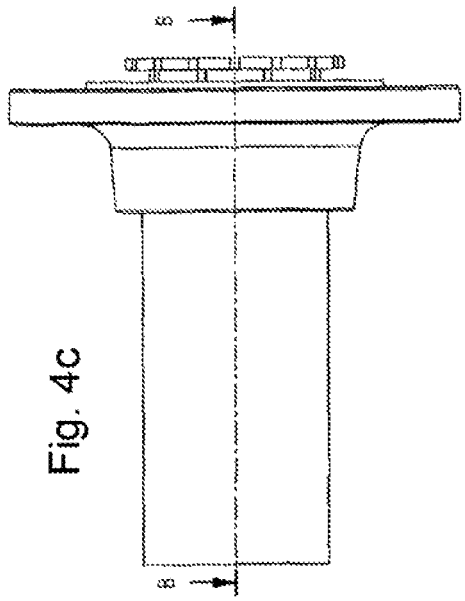
Figure 4D:
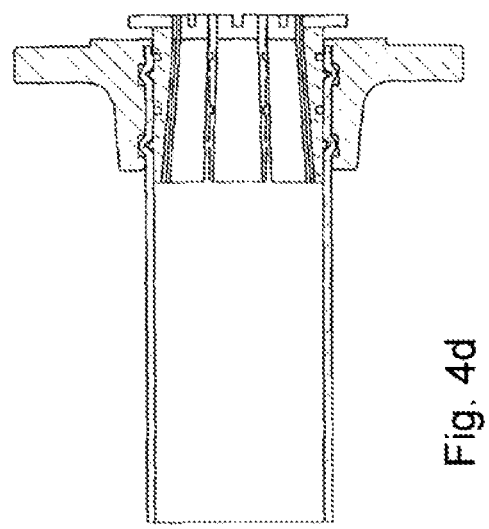
FIG. 4d is a sectional view taken along the line B-B of FIG. 4c.
Figure 5B:
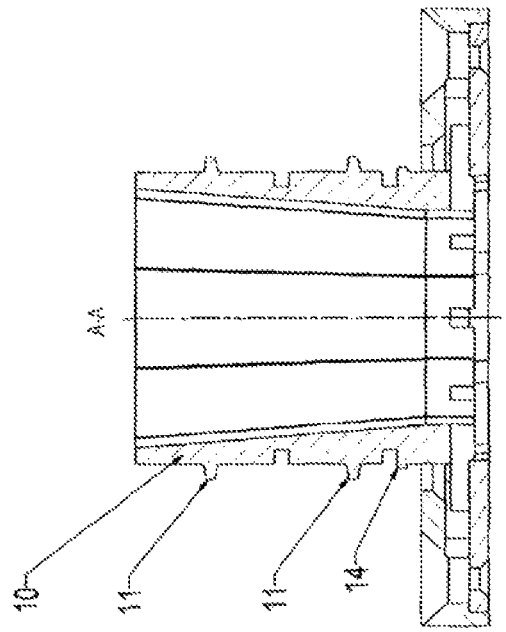
Figure 5A:
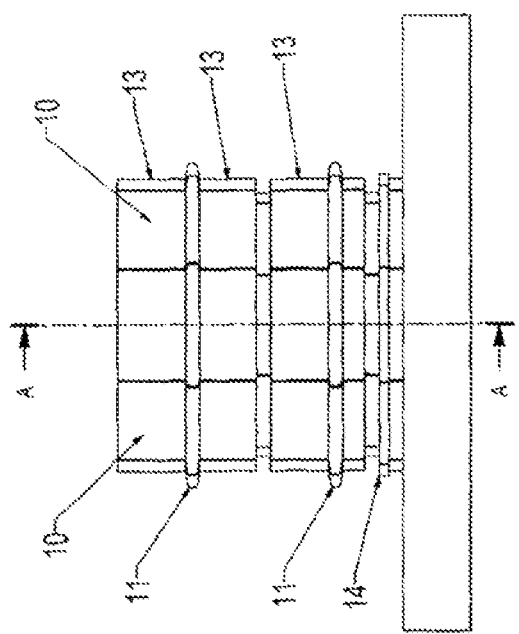
FIG. 5a shows the principle of a tool to deform the beads.
Figure 11:
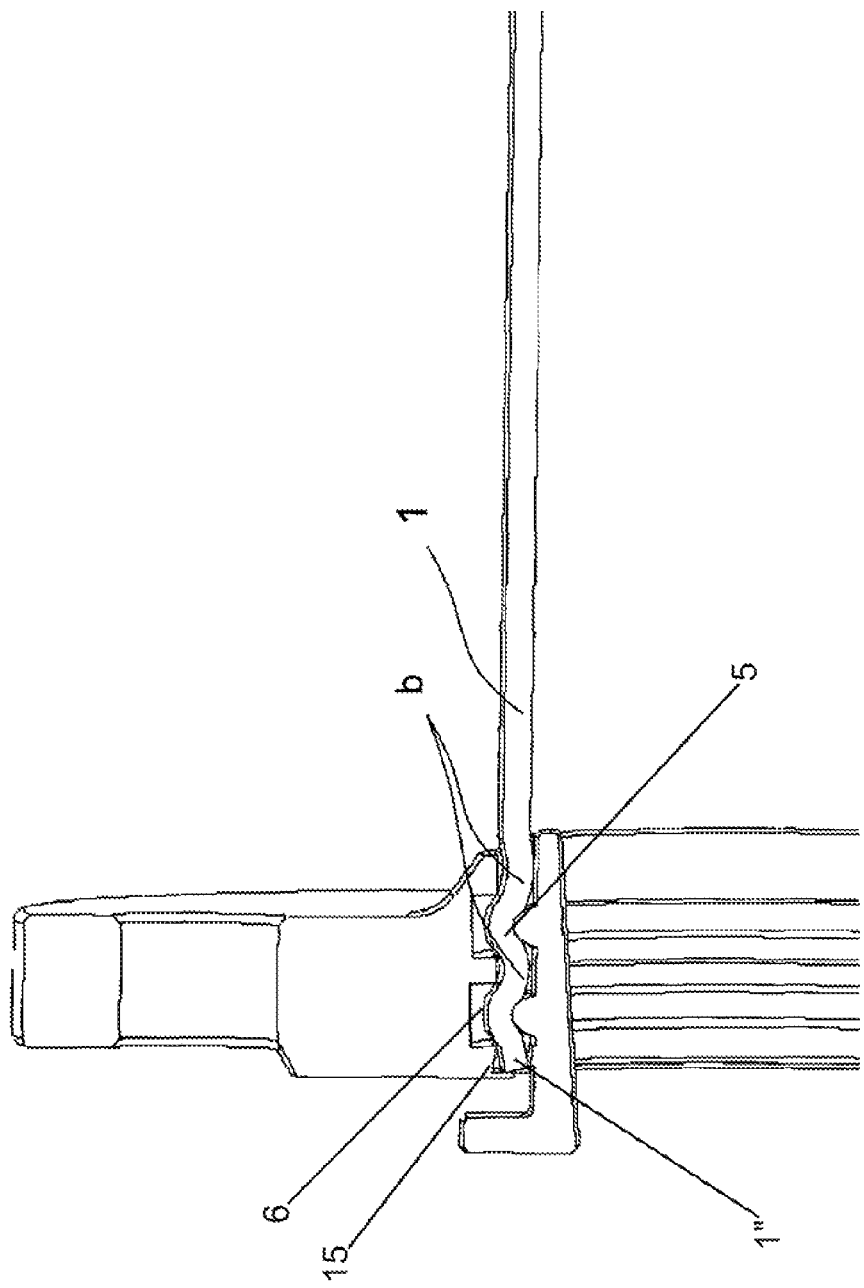
FIG. 11 is an enlarged view of an intermediate stage during the process of pressing as shown in FIGS. 4a and 4b.

According to FIGS. 5a and 5b, the principle of the tool is based on a plurality of segments 10 having circular segment ridges 11 intended for being pressed out towards the inside of the pipe wall and thus forming the beads 5, 6 first. Towards the end of the pressing operation, the cylindrical segment parts 13 of each of the segments forming a cylindrical assembly of segments is pressed against the inside of the pipe at the portions located sideways relative to the beads 5, 6 to prevent said portions from buckling inwards. This process is shown on FIGS. 4a-4d as well as on FIG. 11. FIGS. 4a and 4b show the pipe 1 and the coupling 2 before the pressing operation, and FIG. 11 is an enlarged view of an intermediate stage during the pressing where the aforementioned buckled-in areas b of the pipe sideways relative to the beads 5, 6 can be seen. In FIGS. 4c and 4d it is seen that the cylindrical parts 13 (FIG. 5a) of the segments 10 have pressed the buckled-in areas b (FIG. 11) back towards the coupling element 2 so that they lie almost flush with the inside wall of the pipe and its diameter. This after-pressing gives a powerful radial tensioning effect in the pipe which increases the contact pressure between pipe 1 and coupling element 2, the sealing points between beads 5, 6 and grooves 3, 4, and prevents the retraction of the pipe 1 as mentioned above when referring to plain ridges as previously described in, for example, DE 3144385. A projection 14 is located innermost on the segments 10, i.e. close to a tool element flange 21, said projection 14 intended to cause pressure against the end 1" of the pipe 1, as indicated also on FIG. 11. In a corresponding portion of the coupling element 2 there is a recess 15 which may be made in the form of a bevel edge or a cut-out. This cut-out 15 can, for some uses, be partially filled with sealing material, or it may have an O-ring fitted therein. This special design of the tool and the coupling element has been found to be necessary in order to prevent the pipe from tapering or buckling inwards as previously mentioned.

The segments 10 and especially the ridges 11 are subjected to extremely large stresses during the pressing operation and are therefore made of hardened steel. Consequently large radial forces are also required to operate the segments 10. As an example thereof, the pressing of a connection between a coupling element 2 and a steel pipe 1 with an outer diameter of 76 mm and a wall thickness of 3.2 mm as shown on FIGS. 2a and 2b by using eight segments 10 would require a radial force per segment of about 200 kN, in total a required force of about 1600 kN. These are huge forces within, a very narrow space, and the tool according to the invention therefore uses a power actuator located outside the pipe 1 combined with a force amplifier 20 inside the pipe 1.

Figure 7:
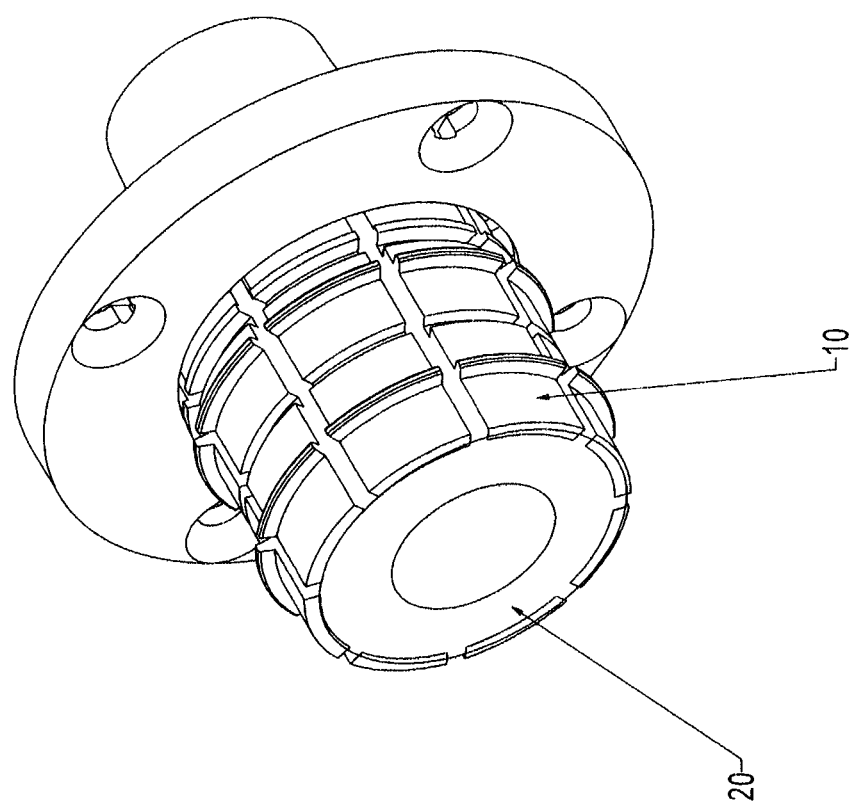
FIG. 7 is a perspective view of the tool of FIG. 6 in an expanded position.

FIG. 6 shows the tool with segments 10 and with a circular cone 20 acting as force amplifier, FIG. 7 shows the tool with the cone 20 drawn in and the segments 10 in expanded position. FIG. 8 shows the same tool with a polygonal pyramid 20' acting as force amplifier.

FIGS. 9a and 9b show a tool with hydraulically operated segments 22. A segment 22 is shown separately and it can be seen that the segment 22 is fastened to a piston 27 which can move in a corresponding cylinder 28 in a housing 24 which is filled with oil. The segments 22 have circle sector ridges 23 to create beads. The illustrated tool has a total of eight pistons 27 and eight cylinders 28. When a rod 25 is pressed into the housing, the oil in the housing 24 will press the pistons 27 outwards. The greater the diameter of the piston 27 in relation to the diameter of the rod 25, the greater the force amplification. Reference numeral 21 denotes a tool attachment flange, the flange having a plurality of attachment holes 26.

A cold joining of the coupling element 2 to the pipe 1 in this manner, unlike, for example, welding, that the material of the coupling is not given a modified surface structure. Therefore, the invention is suitable for couplings as shown in FIGS. 10a and 10b where a coupling element 30 has an outer surface being part of a spherical surface, the coupling element 30 to be fastened to the pipe 1 and where a two-part flange has parts 30', 30" which can be joined to each other by screw action attachment, the two parts 30', 3" located on each side of the coupling element and facing one another. The flange with its flange parts 30', 30" will then be capable of being mounted at an angle which can be variably set relative to the pipe. The flange with its parts 30', 30" will either be freely movable, even after screwing the flange parts 30', 30" together, or will be such that it is locked in the coupling element 30 when the flange 30', 30" is tightened to another flange (not shown).

The embodiments of the invention in which an exclusive property or privilege is claimed are defined as follows:

1. A tool for joining a coupling element to a pipe comprising; a bundle of axially separated, radially movable segments parallel to a longitudinal axis of the tool, each said segment having axially spaced circular sector-formed ridges that provide the tool with a plurality of circumferentially extending ridges to expand against an inside surface of a pipe to deform a pipe wall at the ridges to create beads that project from an outside wall surface of a pipe into corresponding annular grooves of a coupling element to join a pipe to a coupling element, the segments further including a sector-formed projection that provides the tool with a circumferential extending projection to expand against the inside surface of a pipe at an open end of a pipe to flare an open end of a pipe such that an open end of a pipe that is joined to a coupling element does not obstruct fluid flow through the pipe, and wherein the segments have circumferential curved portions parallel to the longitudinal axis of the tool and located adjacent and between the circumferentially extending ridges, for a post-pressing of any buckled-in areas of a pipe that occur in a pipe wall between and adjacent the circumferential beads that are formed in a pipe wall during a first pressing action, such post-pressing of any buckled-in areas of a pipe producing a radially outward tension in a pipe at the location of the coupling element.

2. An apparatus for joining a coupling element to a pipe comprising;
  a) a coupling element connectable to a pipe separate and apart from any other pipe, the coupling element having an annular portion with an annular inner surface and a flange portion that extends radially from the annular portion,
  b) the annular portion being sized to surround an outside surface of a pipe at an end region of the pipe that includes a pipe opening,
  c) the annular inner surface being formed with an annular recess at a foremost portion of the coupling element for alignment with an open end of a pipe, the annular recess having a predetermined diameter greater than the outer diameter of a pipe at an open end to permit an open end of a pipe to flare outwardly into the annular recess,
  d) the annular inner surface also being formed with a plurality of axially spaced annular grooves to permit portions of a pipe wall to deform into the annular grooves as circumferential heads that project into the annular grooves to join the coupling element to a pipe,
  e) an expansion tool having a longitudinal axis, a first plurality of axially separated, radially movable segments, each said segment having axially spaced circular sector-formed ridges that provide the tool with a plurality of circumferentially extending ridges that respectively align with respective said annular grooves in the coupling element, to form circumferential beads in a pipe wall that project into the annular grooves, said segments further including a sector-formed projection that provides the tool with a circumferential extending projection that aligns with the annular recess at the foremost portion of the coupling element, to form a flared end of a pipe to extend radially outwardly into the annular recess,
  and wherein the axially spaced annular grooves in the coupling element have a first axial width and the corresponding circumferentially extending ridges in the expansion tool have a second axial width, the first axial width being substantially greater than the second axial width,
  and wherein the segments have circumferential curved portions parallel to the longitudinal axis of the expansion tool and located adjacent and between the circumferentially extending ridges, for a post-pressing of any buckled-in areas of a pipe that occur in a pipe wall between and adjacent the circumferential beads that are formed in a pipe wall during a first pressing action, such post-pressing of any buckled-in areas of a pipe producing a radially outward tension in a pipe at the location of the coupling element.

3. The apparatus as claimed in claim 2 wherein the circumferentially extending ridges in the expansion tool have a predetermined radial height that is of greater magnitude than the second axial width of the circumferentially extending ridges.

4. The apparatus as claimed in claim 2 further including means for expanding the radially movable segments in a radially outward direction to urge the circumferentially extending ridges toward the corresponding annular grooves of the coupling element and to urge the circumferentially extending projection toward the corresponding annular recess at the foremost portion of the coupling element such that an end portion of a pipe positioned between the coupling element and the expansion tool is deformable into beads that project into the corresponding annular grooves of the coupling element and the open end of the pipe is deformable radially outwards into the corresponding annular recess of the coupling element to flare an open end of a pipe into the corresponding annular recess of the coupling element.

5. The apparatus as claimed in claim 4 wherein the expansion tool is hollow with an internal conical shape or polygonal pyramid shape and the means for expanding the radially movable segments in a radially outward direction include an elongated mandrel of complementary conical or polygonal pyramid shape slidably movable in the hollow space of the expansion tool, to interfere with and cause radially outward movement of the radially movable segments.

6. The apparatus as claimed in claim 4 wherein the expansion tool is hollow and the means for expanding the radially movable segments in a radially outward direction include hydraulic cylinders with respective pistons located within the hollow space and respectively associated with each said segment such that movement of the pistons in one direction causes radially outward movement of the segments and movement of the pistons in an opposite direction causes radial retraction of the segments.

7. The apparatus as claimed in claim 2 wherein the flange is at one end portion of the coupling element and the annular portion at the one end of the coupling element has a spherical shape and the flange that extends radially from the annular portion at the one end of the coupling element has a spherical socket for swivel mounting of the flange portion on the spherical shape to permit angular adjustment of the flange portion on the spherical shape relative to a longitudinal axis of the annular portion.

8. The apparatus as claimed in claimed 7 wherein the flange portion is securable in a fixed adjusted position on the spherical shape.

9. The apparatus as claimed in claim 7 wherein the flange portion includes two spaced flange parts each having the spherical mounting socket for angular adjustment of the respective flange parts on the spherical shape relative to a longitudinal axis of the annular portion.

10. The apparatus as claimed in claim 9 wherein the two spaced flange parts are joinable to each other.

11. The apparatus as claimed in claim 9 wherein the two spaced flange parts are securable in a fixed adjusted position on the spherical shape.

* * * * *